United States Patent
Goldschmidt et al.

(10) Patent No.: US 11,782,702 B2
(45) Date of Patent: Oct. 10, 2023

(54) GENERATION OF CODE FOR A SYSTEM

(71) Applicant: Elektrobit Automotive GmbH, Erlangen (DE)

(72) Inventors: Benjamin Goldschmidt, Fürth (DE); Guillaume Cordon, Médan (FR); Rudolf Grave, Erlangen (DE)

(73) Assignee: Elektrobit Automotive GmbH, Erlangen (DE)

( * ) Notice: Subject to any disclaimer, the term of this patent is extended or adjusted under 35 U.S.C. 154(b) by 66 days.

(21) Appl. No.: 17/487,147

(22) Filed: Sep. 28, 2021

(65) Prior Publication Data

US 2022/0113961 A1   Apr. 14, 2022

(30) Foreign Application Priority Data

Oct. 8, 2020 (EP) ..................... 20315430

(51) Int. Cl.
*G06F 8/71* (2018.01)
*G06F 8/36* (2018.01)
*G06F 8/75* (2018.01)
*G06F 11/36* (2006.01)

(52) U.S. Cl.
CPC ............... *G06F 8/71* (2013.01); *G06F 8/36* (2013.01); *G06F 8/75* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| | | |
|---|---|---|
| 8,448,130 B1 | 5/2013 | Pillarisetti et al. |
| 2010/0292867 A1 | 11/2010 | Boehm et al. |
| 2015/0020080 A1* | 1/2015 | Simsek ............. G06F 9/546 719/314 |
| 2019/0052543 A1 | 2/2019 | Bansal et al. |
| 2020/0192722 A1 | 6/2020 | Lenz et al. |
| 2021/0012588 A1* | 1/2021 | Kwon .............. G07C 5/0825 |
| 2021/0286925 A1* | 9/2021 | Wyrwas ............ G06V 20/56 |
| 2021/0389144 A1* | 12/2021 | Kim ................ G01C 21/362 |

OTHER PUBLICATIONS

Sandmann, "Development of AUTOSAR Software Components within Model-Based Design", 2008, MathWorks (Year: 2008).*

(Continued)

*Primary Examiner* — Hossain M Morshed (57) ABSTRACT

To generate code for a system, in a first step, configuration information for the system is retrieved, which describes a system management scheme. Based on this configuration information, code is generated for managers of the system, the code comprising a system management library for each manager, which contains interfaces required by the manager for sending and receiving messages. In addition, code for software platforms of the system is generated, the code comprising a system management router for each software platform, which enables an exchange of messages between managers. Optionally, system management tests may be generated for the system management libraries or the system management routers.

14 Claims, 3 Drawing Sheets

(56) References Cited

OTHER PUBLICATIONS

Urbina, "Simulation Environment based on SystemC and VEOS for Multi-Core Processors with Virtual AUTOSAR ECUs", 2015, IEEE (Year: 2015).*

Deepika, "Implementation of DCM module for AUTOSAR Version 4.0", 2013, International Journal of Enhanced Research in Science Technology & Engineering (Year: 2013).*

Jong-Woon Yoo et al. "An Android-based automotive middleware architecture for plug-and-play of applications", Open Systems (ICOS), 2012, IEEE Conference On, IEEE, Oct. 21, 2012, pp. 1-6—XP032312857.

Search Report dated Mar. 2, 2022 from corresponding European patent application No. 21199355.5.

\* cited by examiner

GENERATION OF CODE FOR A SYSTEM

BACKGROUND

The present invention is related to a method, a computer program code, and an apparatus for generating code for a system.

Modern vehicles are capable of supporting a large number of sophisticated functions. Examples of such functions are navigation and maneuvering, advanced engine control, image processing and driver assistance. Typically, dedicated electronic control units (ECU) are provided for implementing these functionalities. Accordingly, the number of electronic control units embedded in vehicles is steadily increasing and can already reach more than 100 ECUs for a single vehicle.

In order to enhance the computational power and software capabilities, electronic control units may be equipped with a plurality of cores. For example, US 2020/0192722 A1 discloses an electronic control unit that includes a plurality of cores. The electronic control unit hosts, by virtualization, a plurality of partitions including a first and a second partition. Each of the partitions is assigned to at least one of the cores. The first partition is implemented to run, on its at least one core, an AUTOSAR (AUTomotive Open System ARchitecture) architecture platform instance providing AUTOSAR basic software services. The second partition is implemented to run, on its at least one core, AUTOSAR software components. A partition interface couples the first and second partitions such that the AUTOSAR software components are run as part of said AUTOSAR architecture platform instance implemented in the first partition.

In modern vehicle architectures, electronic control units are grouped in so-called zones, with each zone featuring a set of electronic control units that are located close to each other. Each zone features one or more so-called gateway electronic control units. These gateway electronic control units are connected to both the electronic control units in their zone as well the gateway electronic control units of other zones, building a network that spans the entire vehicle. Zonal vehicle architectures typically require less wiring, which leads to a reduction in production costs and in weight. The reduction in weight in turn leads to a higher fuel-efficiency.

In this regard, US 2020/0125858 A1 discloses a power and data center, which serves as a combined data concentrator and power distributor that delivers scalable and affordable network/power redundancy into an automotive electrical/electronic architecture that supports partially or fully autonomous vehicles. A vehicle that includes the smart electrical/electronic architecture is divided into zones, where each zone includes one or more power and data centers and one or more sensors, actuators, controllers, loudspeakers or other devices that are coupled to and powered by their zone power and data center(s). Each power and data center collects and processes (or passes through) raw or pre-processed sensor data from the one or more sensors in its zone. The sensors provide their data to the power and data center by way of cost efficient, short-range data links. One or more actuators in each zone are coupled to their respective zone power and data center, and receive their control data from the power and data center over a high-speed data bus or data link.

While solutions exist to manage the health, status, life cycle, and power of individual electronic control units in these zonal vehicle architectures that feature only a single software platform, such as AUTOSAR Classic, there is no standardized way of performing the aforementioned managing functions for more complex electronic control units, e.g. the gateway electronic control units, that feature several software platforms, such as AUTOSAR Classic, AUTOSAR Adaptive, Android, QNX, etc. In addition, no solution exists for performing these managing functions on zone-, vehicle-, or feature-level.

Typically, custom modules for the different system management functions are implemented and allocated to the different software platforms in the system in order to solve this problem. Since the software platforms that are used in zonal vehicle architectures usually have very different application programming interfaces (API), the modules must be custom-build for the different software platforms. The modules must then be manually connected to each other and to the relevant software platform modules. Here, the different interactions between the modules must be specified and coordinated. As system functions are usually highly safety- and security-critical, it must be ensured that the modules are free from unwanted interference, e.g. from other modules or malignant actors. Furthermore, it must be ensured that data that is shared between the modules is consistent and that inconsistent data can be reliably detected.

Existing solutions for system management are focused on single electronic control units running a single software platform. There is no solution that enables safe/secure system management across different software platforms in a scalable way. The current development process is very manual and platform specific: Modules can typically not easily be ported to different platforms. The synchronization and coordination across software platforms is typically very error prone, as the different implementations must always be manually held in sync. Due to the very high safety/security requirements, the development is typically very time-consuming and costly. Once the implementation is certified, additional changes typically carry very high costs due to recertification. Overall, the current approach does not scale well for larger systems, as the work required to implement and coordinate the different modules in a safe and secure way typically increases significantly with each new module or software platform. The resulting implementation is typically custom-built for a given system and cannot easily be transferred to new or different systems.

BRIEF SUMMARY

It is an object of the present invention to provide an improved solution for generating code for a system.

This object is achieved by a method according to claim 1, by a computer program code according to claim 13, which implements this method, and by an apparatus according to claim 14. The dependent claims include advantageous further developments and improvements of the present principles as described below.

According to a first aspect, a method for generating code for a system comprises the steps of:
  retrieving configuration information for the system, which describes a system management scheme;
  generating code for managers of the system, the code comprising a system management library for each manager, which contains interfaces required by the manager for sending and receiving messages; and
  generating code for software platforms of the system, the code comprising a system management router for each software platform, which enables an exchange of messages between managers.

Accordingly, a computer program code comprises instructions, which, when executed by at least one processor, cause the at least one processor to perform the following steps for generating code for a system:

retrieving configuration information for the system, which describes a system management scheme;

generating code for managers of the system, the code comprising a system management library for each manager, which contains interfaces required by the manager for sending and receiving messages; and generating code for software platforms of the system, the code comprising a system management router for each software platform, which enables an exchange of messages between managers.

The term computer has to be understood broadly. In particular, it also includes workstations and other processor-based data processing devices.

The computer program code can, for example, be made available for electronic retrieval or stored on a computer-readable storage medium.

According to another aspect, an apparatus for generating code for a system comprises:

a retrieving unit configured to retrieve configuration information for the system, which describes a system management scheme; and a code generator configured to generate code for managers of the system, the code comprising a system management library for each manager, which contains interfaces required by the manager for sending and receiving messages, and to generate code for software platforms of the system, the code comprising a system management router for each software platform, which enables an exchange of messages between managers.

To solve the problems outlined above, the solution according to the invention uses a code generation-based approach. The development of system management schemes is separated into three key stages, namely configuration, code generation, and integration. In the configuration stage, the system management scheme is described on a high level by the user. In the code generation stage, code is generated for each software platform and manager in the system based on the system management configuration. In the integration stage, which is performed by the user guided by the product, the generated code is integrated into the system.

The system management routers enable the exchange of messages between managers. To this end, one system management router is generated for each software platform in a system. Each system management router is connected to all managers on the software platform to which it is allocated. Additionally, it is connected to all other system management routers in the system to enable the exchange of messages across software platforms. The system management router code is generated based on the configuration. The resulting code is specific for each software platform.

For each manager that is defined in the configuration information, a specific system management library is generated. The library contains the interfaces that the manager requires for sending and receiving messages that may be specified in the configuration information. By limiting the application programming interfaces for each manager in this way, managers cannot accidentally send or receive messages that they are not configured to send or receive. The generated libraries connect the managers to the system management router on the corresponding platform and abstract the underlying communication mechanisms.

Using the configuration and code generation-based approach according to the invention allows validating the system management scheme as a whole, even before implementation. In addition, system management schemes of various sizes can be implemented effectively, even for larger systems featuring many software platforms and managers, as the coordination and synchronization does not have to be handled manually. This reduces costs. Managers and their functionality can more easily be ported to different software platforms or even other systems, if necessary, as the effort and thus the costs required for this are reduced significantly.

A further advantage is that the synchronization and coordination across software platforms is less error prone, as the different implementations are automatically held in sync. For example, by describing the information that managers share in the configuration information and generating code based on this information, it can be guaranteed that data is encoded/decoded correctly on the sending/receiving side. This increases safety, security, quality, and ultimately reduces costs.

Furthermore, hardware and software platform details are abstracted. This allows users to focus on system management and not on the infrastructure required for system management. This in turn leads to cost reductions and better portability.

In an advantageous embodiment, software platform-specific build, installation, and integration code is generated for each system management router. This code allows an efficient and reliable integration of the system management routers into the respective target software platforms.

In an advantageous embodiment, software platform-specific application programming interfaces are used for the communication between the system management router and the managers. This has the advantage that the communication can resort to already available application programming interfaces.

In an advantageous embodiment, the configuration information for the system comprises at least information about software platforms, interfaces, and managers. Software platforms in the system may, for example, include AUTOSAR Classic, AUTOSAR Adaptive, QNX, Linux, Android, etc. The information about interfaces specifies the communication interfaces between the software platforms, such as SOME/IP, TCP/IP, CAN, CAN FD, SPI, shared memory, etc. Software platforms can be connected by more than one interface. The format also allows connecting multiple software platforms over one interface. Connections can be one- or bidirectional. Managers are software modules that perform certain managing tasks, such as supervising the health of a software platform, managing the state of an entire electronic control unit, managing the power of all electronic control units on vehicle level, starting, restarting, or stopping software modules or hardware elements, etc. Each manager is allocated to a software platform. This information in combination with the general system layout, as defined by the interfaces between the software platforms, may be used to generate connections between managers and to check the validity of the configuration.

In an advantageous embodiment, the configuration information for the system further comprises information about at least one of message types, status reports, and control requests. To enable management on system-level, the different managers in the system can exchange messages. The messages that managers exchange are defined in two parts. First, so-called message types that describe the content messages are defined. Second, the message types are used to describe interactions between managers. In this way, one message type can be used in multiple different manager interactions without the need to redefine it each time. The message content consists of user data that is to be exchanged and metadata that is automatically to be included in the message. Status reports are configurable messages, based on the afore-mentioned message types, which managers can exchange. For example, they can contain the current status of a software platform, of certain applications, and/or hardware elements, etc. Control requests allow requesting certain actions from other managers. The definition of control requests follows the same approach as the definition of status reports. A main difference between status reports and control requests is in the definition of sending and receiving managers.

In an advantageous embodiment, the configuration information specifies protection measures for the message types. Safety/security features may be defined individually for the various message types. In this way, the resource usage of the system management scheme can be flexibly adapted. This allows limiting the overhead of the system management scheme on the overall system performance. Ultimately, this can lead to energy savings and make even complex management schemes viable. Safety/security features may include static filtering of unknown or unexpected messages at system management router level, end-to-end protection for messages to detect inconsistencies in messages, sequence numbers to detect missing messages, send and receive timestamps to detect outdated or missing messages, or send and receive acknowledgments, to name a few.

In an advantageous embodiment, the configuration information defines a single sending manager and one or more receiving managers for each status report. Based on this information, it can easily be detected during an automatic validity check of the configuration if there is no receiver for a report.

In an advantageous embodiment, a control request enables a manager to request other managers to execute a control action. Through control requests, managers can request other managers to execute certain control actions. For example, a global health manager may request a local health manager to restart its software platform.

In an advantageous embodiment, the configuration information defines accountability for each control request. Instead of just describing which managers send and which managers receive control requests, a so-called RACI (responsible, accountable, consulted, informed)-matrix is preferably used to define accountability for each control request. "Responsible" refers to the manager that requests a control action through a control request. "Accountable" refers to one or more managers that should execute the requested control action. "Consulted" refers to one or more managers that should be consulted before the requested control action is executed. Each manager to be consulted receives the control request and must sign it off before it is executed. "Informed" refers to one or more managers that receive the control request for information only.

In an advantageous embodiment, system management tests are generated for the system management libraries or the system management routers. By generating tests, certification efforts and thus costs are reduced. Furthermore, also recertification overhead and corresponding costs due to changes are reduced.

In an advantageous embodiment, the system management tests comprise at least one of unit tests, integration tests, software tests, interface tests, fault-injection tests, and static code analysis tests. Which tests are actually generated may depend on the required safety-level, as e.g. defined by ISO 26262. Unit tests may, for example, include statement coverage, branch coverage, or modified condition/decision coverage (MC/DC). Software tests may, for example, include resource usage tests.

In an advantageous embodiment, generation of system management tests comprises generation of a test execution and automation framework. This simplifies performing the tests after integration.

Preferably, the JavaScript object notation (JSON) format is used for configuration files. By specifying the entire system management scheme in a single location, the validity of the configuration can automatically be checked. For example, it can be detected if there is no receiver for a report or request. Furthermore, duplicate reports, missing interfaces, and erroneous manager connections can be detected.

Advantageously, a vehicle comprises a system provided with code generated by an apparatus according to the invention or generated in accordance with a method according to the invention. In the automotive field, the described solution can be used for systems of varying size. It is particularly useful for systems implementing a zonal architecture. In addition to automotive applications, the described solution is generally useful for embedded systems.

Further features of the present invention will become apparent from the following description and the appended claims in conjunction with the figures.

DETAILED DESCRIPTION

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, systems on a chip, microcontrollers, read only memory (ROM) for storing software, random access memory (RAM), and nonvolatile storage.

Other hardware, conventional and/or custom, may also be included.

Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 1:
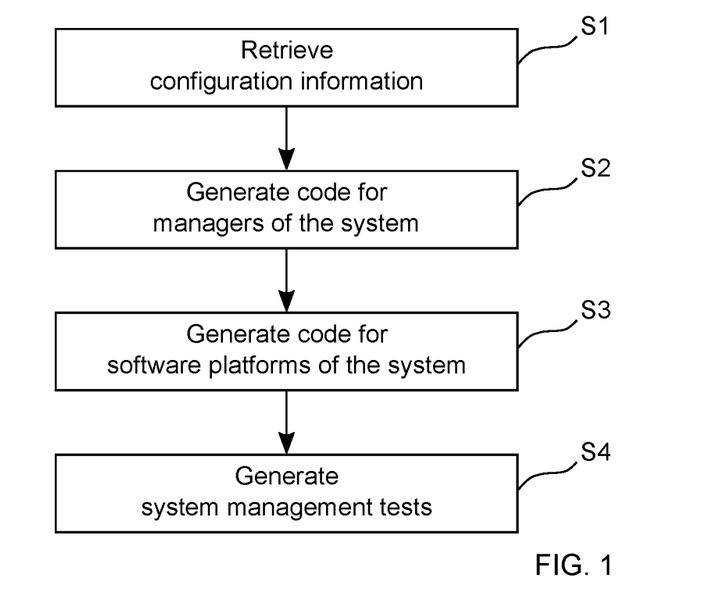
FIG. 1 schematically illustrates a method for generating code for a system.

FIG. 1 schematically illustrates a method according to the invention for generating code for a system. In a first step, configuration information for the system is retrieved S1, which describes a system management scheme. Based on this configuration information, code is generated S2 for managers of the system. The code comprises a system management library for each manager, which contains interfaces required by the manager for sending and receiving messages. In addition, code for software platforms of the system is generated S3. The code comprises a system management router for each software platform, which enables an exchange of messages between managers. Optionally, system management tests may be generated S4 for the system management libraries or the system management routers. In this context, also a test execution and automation framework may be generated.

Figure 2:
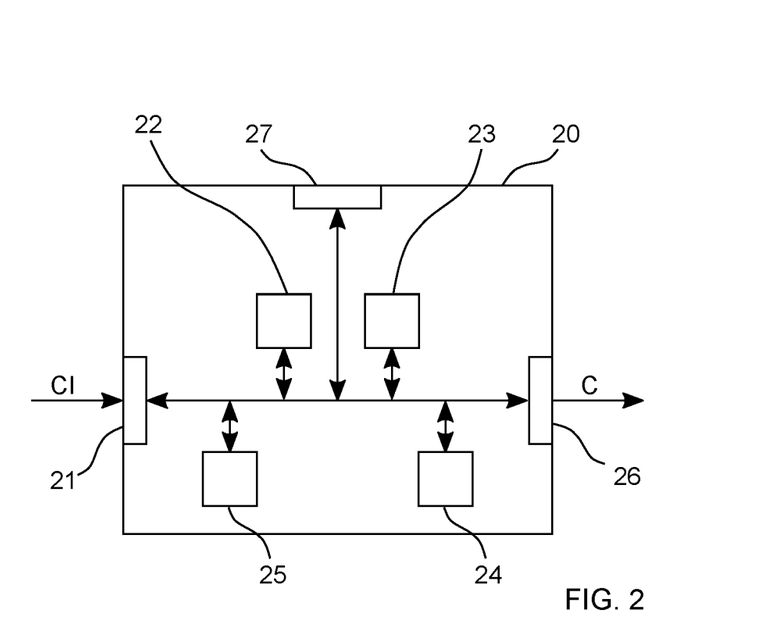
FIG. 2 schematically illustrates a first embodiment of an apparatus for generating code for a system.

FIG. 2 schematically illustrates a block diagram of a first embodiment of an apparatus 20 according to the invention for generating code for a system. The apparatus 20 has an input 21, via which a retrieving unit 22 retrieves configuration information CI for the system, which describes a system management scheme. A code generator 23 is configured to generate code C for managers of the system. The code C comprises a system management library for each manager, which contains interfaces required by the manager for sending and receiving messages. The code generator 23 is further configured to generate code C for software platforms of the system. The code C comprises a system management router for each software platform, which enables an exchange of messages between managers. Optionally, the code generator 23 may further generate system management tests for the system management libraries or the system management routers, as well as a test execution and automation framework. The generated code C is made available for integration into the system via an output 26. The output 26 may be combined with the input 21 into a single interface. A local storage unit 25 is provided, e.g. for storing data during processing.

The retrieving unit 22 and the code generator 23 may be controlled by a control module 24. A user interface 27 may be provided for enabling a user to modify settings of the retrieving unit 22, the code generator 23, and the control module 24. The retrieving unit 22, the code generator 23, and the control module 24 can be embodied as dedicated hardware units. Of course, they may likewise be fully or partially combined into a single unit or implemented as software running on a processor, e.g. a CPU or a GPU.

Figure 3:
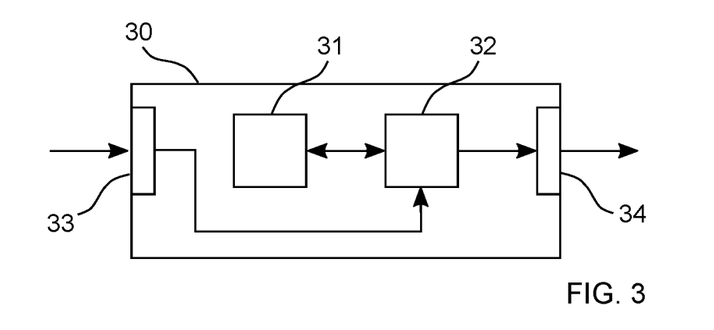
FIG. 3 schematically illustrates a second embodiment of an apparatus for generating code for a system.

A block diagram of a second embodiment of an apparatus 30 according to the invention for generating code for a system is illustrated in FIG. 3. The apparatus 30 comprises a processing device 32 and a memory device 31. For example, the apparatus 30 may be a computer, an electronic control unit or an embedded system. The memory device 31 has stored instructions that, when executed by the processing device 32, cause the apparatus 30 to perform steps according to one of the described methods. The instructions stored in the memory device 31 thus tangibly embody a program of instructions executable by the processing device 32 to perform program steps as described herein according to the present principles. The apparatus 30 has an input 33 for receiving data. Data generated by the processing device 32 are made available via an output 34. In addition, such data may be stored in the memory device 31. The input 33 and the output 34 may be combined into a single bidirectional interface.

The processing device 32 as used herein may include one or more processing units, such as microprocessors, digital signal processors, or a combination thereof.

The local storage unit 25 and the memory device 31 may include volatile and/or non-volatile memory regions and storage devices such as hard disk drives, optical drives, and/or solid-state memories.

Figure 4:
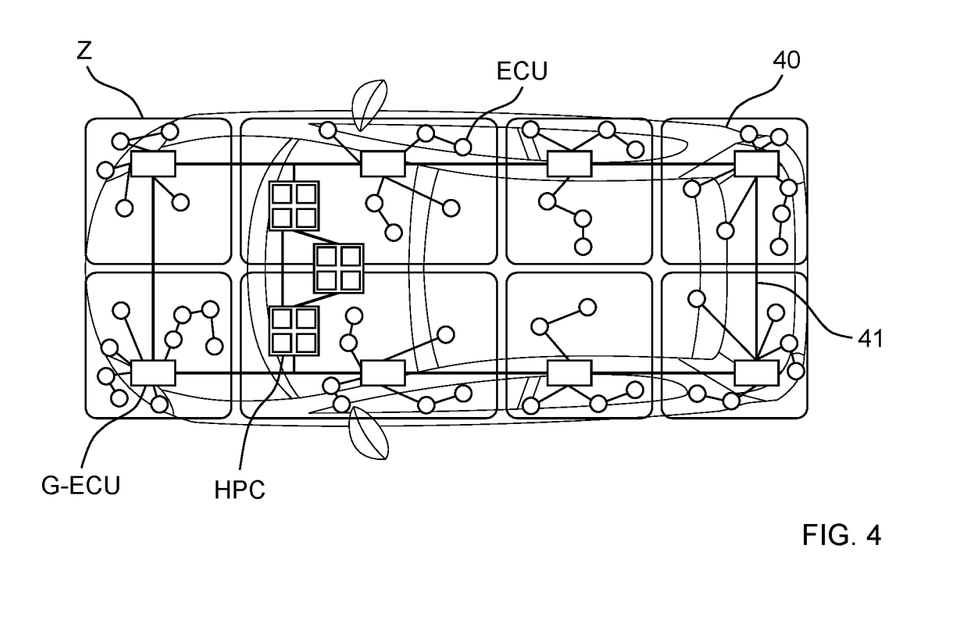
FIG. 4 schematically illustrates a motor vehicle with a zonal vehicle architecture.

FIG. 4 schematically shows a motor vehicle 40 with a zonal vehicle architecture. The vehicle 40 comprises a plurality of electronic control units ECU for the various sensors and actuators of the vehicle 40. The sensors and actuators may include, for example, various types of sensors and actuators typically used for autonomous driving, such as Global Positioning System (GPS) sensors, cameras, radar sensors, ultrasonic sensors, and the like for sensing position and/or driving conditions and actuators for physically performing actions such as causing a navigational response, controlling the motion of the vehicle, accelerating, changing gears, applying brakes, steering, and the like. The electronic control units ECU are grouped in so-called zones Z, with each zone Z featuring a set of electronic control units ECU that are located close to each other. Each zone Z features at least one gateway electronic control unit G-ECU. These gateway electronic control units G-ECU are connected to both the electronic control units ECU in their zone Z as well the gateway electronic control units G-ECU of other zones Z, building a network 41 that spans the entire vehicle 40. In addition, the vehicle may comprise one or more high performance computers HPC, which provide advanced data processing and data security functionalities. A zonal vehicle architecture typically requires less wiring, which leads to a reduction in production costs and in weight. The reduction in weight in turn leads to a higher fuel-efficiency. Furthermore, this architecture enables more advanced features, such as automated driving, and business models.

Figure 5:
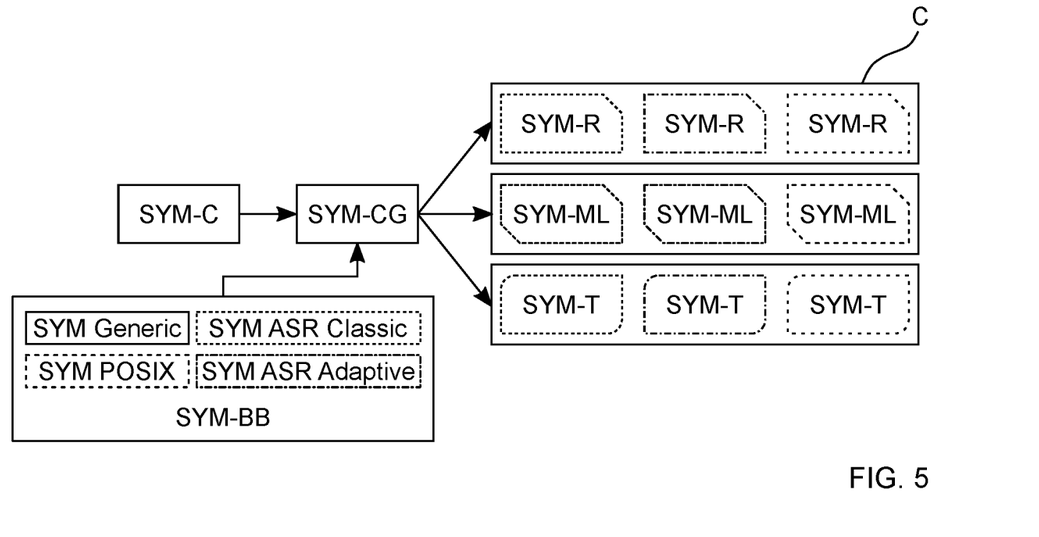
FIG. 5 schematically illustrates stages of an exemplary code generation-based approach for a system management scheme.

FIG. 5 schematically illustrates stages of an exemplary code generation-based approach for a system management scheme according to the invention. Depicted are a configuration stage SYM-C and a code generation stage SYM-CG. The system management scheme further includes a subsequent integration stage, which is not shown in FIG. 5.

In the configuration stage SYM-C, the system management scheme is described on a high level by the user to generate configuration information. Elements that may be considered in the configuration stage are, for example:

Software platforms: The configuration information describes the software platforms in the system, such as AUTOSAR Classic, AUTOSAR Adaptive, QNX, Linux, Android, etc.

Interfaces: The configuration information describes the communication interfaces between the software platforms, such as SOME/IP, TCP/IP, CAN, CAN FD, SPI, shared memory, etc. Software platforms can be connected by more than one interface. The format also allows connecting multiple software platforms over one interface. Connections can be one- or bidirectional.

Managers: The configuration information describes the managers of the system. Managers are software modules that take over certain managing tasks, such as supervising the health of a software platform, managing the state of an entire electronic control unit, managing the power of all electronic control units on vehicle level, starting, restarting, or stopping software modules or hardware elements, etc. Each manager must be allocated to a software platform. This information in combination with the general system layout, as defined by the interfaces between the software platforms, is used to generate connections between managers and may be used to check the validity of the configuration.

Message types: The configuration information describes the message types used in the system. To enable management on system-level, the different managers in the system can exchange messages, e.g. for sharing their current status or for requesting certain actions from other managers, e.g. for restarting a software module or hardware element, for warning about upcoming changes or problems, etc. The messages that managers exchange are defined in two parts. First, so-called message types that describe the content and safety/security features of messages are defined. Second, the message types are used to describe interactions between managers. In this way, one message type can be used in multiple different manager interactions without the need to redefine it each time. The message content consists of user data that is to be exchanged, which may be given as a set of data fields similar to a struct object in C/C++ and freely configurable by users, and metadata that is automatically to be included in the message, e.g. the time a message was sent or received.

Status reports: The configuration information describes status reports, which are configurable messages, based on the afore-mentioned message types, which managers can exchange. For example, they can contain the current status of a software platform, of certain applications, or hardware elements, etc. For each status report, a single sending manager and one or more receiving managers are defined.

Control requests: The configuration information describes control requests, through which managers can request other managers to execute certain control actions. For example, a global health manager may request a local health manager to restart its software platform. The definition of control requests follows the same approach as the definition of status reports. A main difference between status reports and control requests is in the definition of sending and receiving managers. Instead of just describing which managers send and which managers receive control requests, a so-called RACI (responsible, accountable, consulted, informed)-matrix is used to define accountability for each control request. "Responsible" refers to the manager that requests a control action through a control request. "Accountable" refers to one or more managers that should execute the requested control action. "Consulted" refers to one or more managers that should be consulted before the requested control action is executed. Each manager to be consulted receives the control request and must sign it off before it is executed. "Informed" refers to one or more managers that receive the control request for information only.

The configuration information may be stored in configuration files, for which the JavaScript object notation (JSON) format may be used. By specifying the entire system management scheme in a single location, the validity of the configuration can automatically be checked. For example, it can be detected if there is no receiver for a report or request. Furthermore, duplicate reports, missing interfaces, and erroneous manager connections can be detected.

In the code generation stage SYM-CG, code C is generated for each software platform and manager in the system based on the system management configuration. For code generation, use may be made of a set of system management building blocks SYM-BB. In FIG. 5, in addition to a generic building block, system management building blocks SYM-BB for AUTOSAR Classic, AUTOSAR Adaptive, and POSIX are shown.

In this exemplary implementation, the code generation stage SYM-CG produces three different work products:

System management routers SYM-R: System management routers SYM-R enable the exchange of messages between managers. For this, one system management router SYM-R is generated for each software platform in a system. Each system management router SYM-R is connected to all managers on the software platform to which it is allocated. Additionally, it is connected to all other system management routers SYM-R in the system to enable the exchange of messages across software platforms. The system management router SYM-R code is generated based on the configuration. The resulting code is specific for each software platform. Here, for each system management router SYM-R only the communication routes that are defined in the configuration are generated. All unknown or unexpected messages are automatically (statically) ignored. This static message filtering is helpful for ensuring freedom of interference for managers. For the interaction with the target software platform of a system management router SYM-R, the specific application programming interfaces of the target software platform are used. In addition, safety and security mechanisms are generated on a per message type basis, depending on the configuration. The employed code generator preferably also supports generating user callouts to allow for custom communication interfaces. Finally, for each system management router SYM-R, software platform-specific build, installation, and integration code is generated. This code allows the integration of the system management router SYM-R into the target software platforms.

System management manager libraries SYM-ML: For each manager that is defined in the configuration, a specific system management library SYM-ML is generated. The library SYM-ML contains the interfaces that the manager requires for sending and receiving the messages that are given in the configuration. By limiting the application programming interfaces for each manager in this way, managers cannot accidentally send or receive messages that they are not configured to send or receive. The generated libraries SYM-ML connect the managers to the system management router SYM-R on the corresponding platform and abstract the underlying communication mechanisms. For the communication between system management router SYM-R and manager (library), software platform-specific application programming interfaces are preferably used.

System management tests SYM-T: For both the system management routers SYM-R and the system management libraries SYM-ML also fitting tests SYM-T may be generated. Depending on the required safety-level, as e.g. defined by ISO 26262, the generated tests may include unit tests, integration tests, software tests, interface tests, fault-injection tests, and static code analysis tests. Unit tests may, for example, include statement coverage, branch coverage, or modified condition/decision coverage (MC/DC). Software tests may, for example, include resource usage tests. In addition to the tests, also the test execution and automation framework can be generated.

Depending on the use case, for each message type, protection measures can preferably be enabled selectively as part of the measures that ensure freedom of interference for managers. Protection measures may include static filtering of unknown or unexpected messages at the level of the system management router SYM-R, such that only configured messages can reach managers, end-to-end protection for messages to detect inconsistencies in messages, sequence numbers to detect missing messages, send and receive timestamps to detect outdated or missing messages, and send and receive acknowledgments.

Additionally, the employed code generator advantageously supports the generation of user callouts to allow for custom protection schemes. To protect against malicious actors, e.g. hackers, messages can also be authenticated on reception, e.g. to detect forged messages.

In integration, which is performed by the user guided by the product, the generated code C is integrated into the system. For this, the generated system management libraries SYM-ML are included in the corresponding managers. Based on the libraries SYM-ML, the managers can then be adapted to send and receive the configured reports and requests. Additionally, the system management routers SYM-R are integrated (configuration, build, install, startup, etc.) into the software platforms and generated user callouts are implemented. Finally, the generated tests may have to be configured, extended, or adapted, depending on the changes made during integration and the required safety level.

REFERENCE NUMERALS

20 Apparatus
21 Input
22 Retrieving unit
23 Code generator
24 Control module
25 Local storage unit
26 Output
27 User interface
30 Apparatus
31 Memory device
32 Processing device
33 Input
34 Output
40 Motor vehicle
41 Network
C Code
CI Configuration information
ECU Electronic control unit
G-ECU Gateway electronic control unit
HPC High performance computer
SYM-BB System management building block
SYM-C Configuration stage
SYM-CG Code generation stage
SYM-ML System management manager library
SYM-R System management router
SYM-T System management test
Z Zone
S1 Retrieve configuration information
S2 Generate code for managers of the system
S3 Generate code for software platforms of the system
S4 Generate system management tests

The invention claimed is:

1. A method for generating code for a system, the system implementing a zonal architecture using several different software platforms, the method comprising:
retrieving configuration information for the system, which comprises information about the software platforms in the system, communication interfaces between the software platforms, and managers, wherein the managers are software modules that perform managing tasks related to health, status, life cycle, and power of individual electronic control units in the system;
generating code for the managers of the system using system management building blocks, which are selected based on the configuration information, the code comprising a system management library for each manager, which contains interfaces required by the manager for sending and receiving messages; and
generating code for the software platforms of the system using system management building blocks, which are selected based on the configuration information, the code comprising a system management router for each software platform, which enables an exchange of messages between managers.

2. The method according to claim 1, wherein software platform-specific build, installation, and integration code is generated for each system management router.

3. The method according to claim 2, wherein software platform-specific application programming interfaces are used for the communication between the system management router and the managers.

4. The method according to claim 3, wherein the configuration information for the system further comprises information about at least one of message types, status reports, and control requests.

5. The method according to claim 4, wherein the configuration information specifies protection measures for the message types.

6. The method according to claim 5, wherein the configuration information defines a single sending manager and one or more receiving managers for each status report.

7. The method according to claim 6, wherein a control request enables a manager to request other managers to execute a control action.

8. The method according to claim 7, wherein the configuration information defines accountability for each control request.

9. The method according to claim 8, further comprising generating system management tests for the system management libraries or the system management routers.

10. The method according to claim 9, wherein the system management tests comprise at least one of unit tests, integration tests, software tests, interface tests, fault-injection tests, and static code analysis tests.

11. The method according to claim 10, wherein generating system management tests comprises generating a test execution and automation framework.

12. A non-transitory computer-readable medium having stored thereon computer-executable instructions, which, when executed by at least one processor, cause the at least one processor to perform a method for generating code for a system, the system implementing a zonal architecture using several different software platforms, the method comprising:
- retrieving configuration information for the system, which comprises information about the software platforms in the system, communication interfaces between the software platforms, and managers, wherein the managers are software modules that perform managing tasks related to health, status, life cycle, and power of individual electronic control units in the system;
- generating code for the managers of the system using system management building blocks, which are selected based on the configuration information, the code comprising a system management library for each manager, which contains interfaces required by the manager for sending and receiving messages; and
- generating code for the software platforms of the system using system management building blocks, which are selected based on the configuration information, the code comprising a system management router for each software platform, which enables an exchange of messages between managers.

13. An apparatus for generating code for a system, the system implementing a zonal architecture using several different software platforms, the apparatus comprising:
- a retrieving unit configured to retrieve configuration information for the system, which comprises information about the software platforms in the system, communication interfaces between the software platforms, and managers, wherein the managers are software modules that perform managing tasks related to health, status, life cycle, and power of individual electronic control units in the system; and
- a code generator configured to generate code for the managers of the system using system management building blocks, which are selected based on the configuration information, the code comprising a system management library for each manager, which contains interfaces required by the manager for sending and receiving messages, and to generate code for the software platforms of the system using system management building blocks, which are selected based on the configuration information, the code comprising a system management router for each software platform, which enables an exchange of messages between managers.

14. A vehicle, characterized in that the vehicle comprises a system provided with code generated by an apparatus, the system implementing a zonal architecture using several different software platforms, the apparatus comprising:
- a retrieving unit configured to retrieve configuration information for the system, which comprises information about the software platforms in the system, communication interfaces between the software platforms, and managers, wherein the managers are software modules that perform managing tasks related to health, status, life cycle, and power of individual electronic control units in the system; and
- a code generator configured to generate code for the managers of the system using system management building blocks, which are selected based on the configuration information, the code comprising a system management library for each manager, which contains interfaces required by the manager for sending and receiving messages, and to generate code for the software platforms of the system using system management building blocks, which are selected based on the configuration information, the code comprising a system management router for each software platform, which enables an exchange of messages between managers.

* * * * *